May 7, 1968
R. F. STENHOLM
3,381,386
PRECISION GEAR GAUGE
Filed Sept. 9, 1966
2 Sheets-Sheet 1
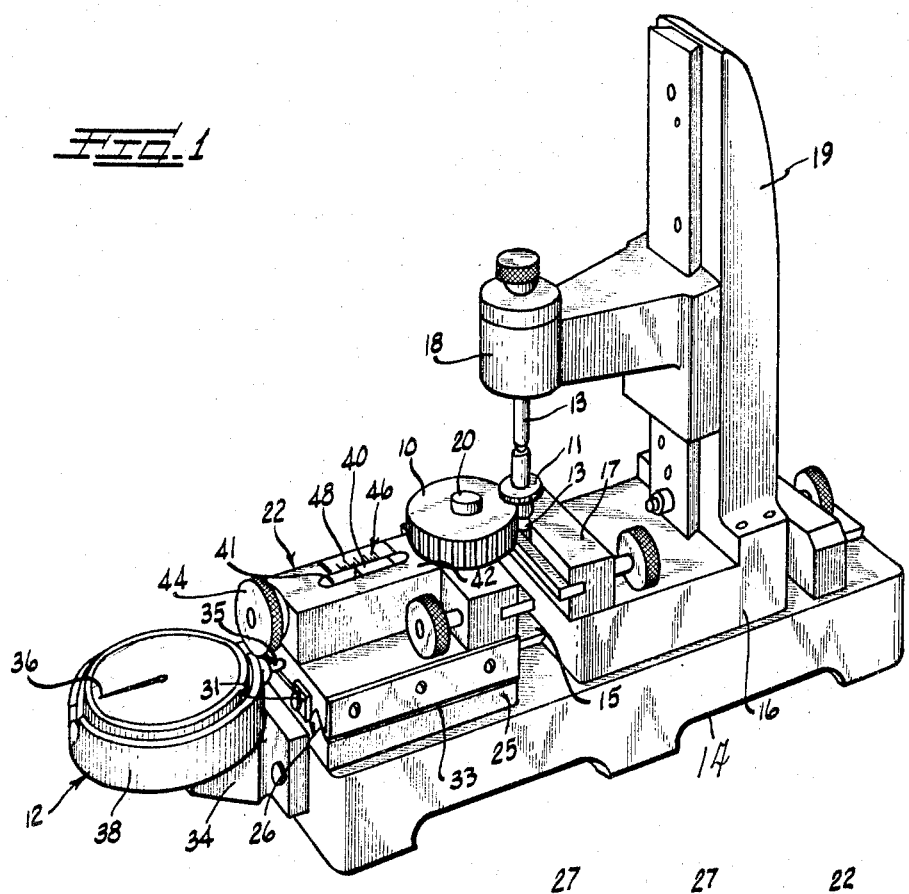
Inventor
ROBERT F. STENHOLM
By Andrew F. Wintercorn Atty May 7, 1968 R. F. STENHOLM 3,381,386
PRECISION GEAR GAUGE
Filed Sept. 9, 1966 2 Sheets-Sheet 2
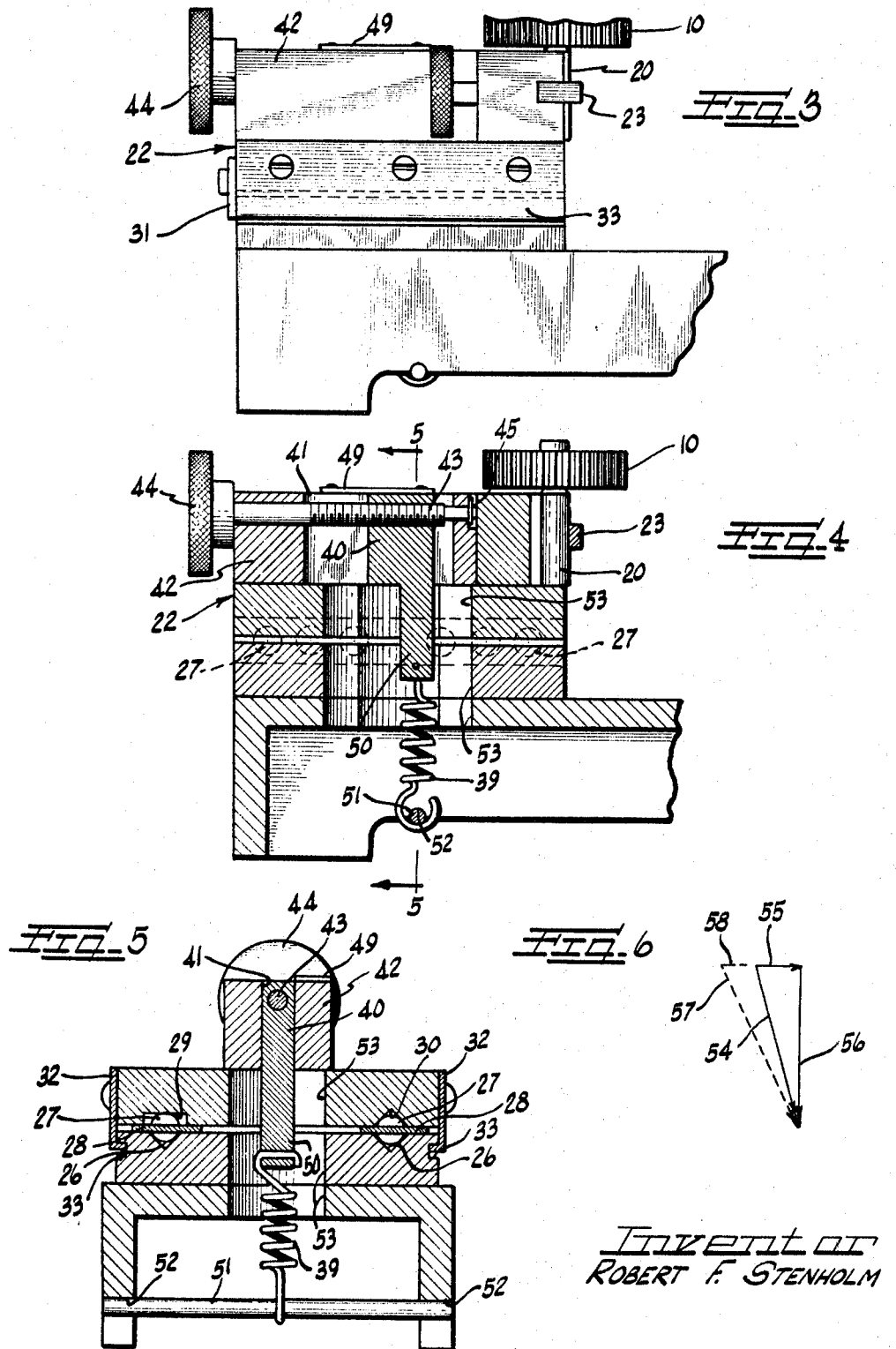
Inventor
ROBERT F. STENHOLM
By Andrew F. Wintercorn Atty

United States Patent Office 3,381,386
Patented May 7, 1968

3,381,386
PRECISION GEAR GAUGE
Robert F. Stenholm, 4405 Pine Crest Road,
Rockford, Ill. 61104
Filed Sept. 9, 1966, Ser. No. 578,182
4 Claims. (Cl. 33—179.5)

This invention relates generally to a hand rolling gear checking machine in which a master gear and a gear to be checked are rotatably mounted in meshing engagement and the support for one of the gears is shiftable rectilinearly in accordance with variations of the test gear from a standard, the shifting being indicated on a suitable gage. More particularly, the invention relates to such a machine in which the movable gear is urged against the other gear under a predetermined pressure of small magnitude variable with the diametrical pitch of the test gear as prescribed by the American Gear Manufacturers Association.

The primary object of the present invention is to provide a gear checking machine of the above character in which the meshing pressure is applied in a novel manner to insure precision in the amount applied, to facilitate accurate adjustment of the amount, and to utilize a part of the force from the source of pressure to maintain a proper sliding support of the movable gear.

Another object is to derive the meshing pressure from a coiled spring which is mounted between a slide for the movable gear and the base of the machine in a novel manner to supply the meshing pressure and also to urge the slide into proper engagement with its anti-friction support.

A more detailed object is to mount the meshing pressure spring in a novel manner such that movement of an adjusting member for changing the pressure and an indication of the amount of pressure being applied are conveniently visible to the user.

Other objects and advantages will become apparent from the following detailed description taken in connection with the accompanying drawings in which:

FIGURE 1 is a perspective view of a precision gear checking machine embodying the novel features of the present invention;

FIGURE 2 is a fragmentary plan view of the machine;

FIGURE 3 is a fragmentary side elevational view of the machine;

FIGURE 4 is a fragmentary sectional view taken along the line 4—4 of FIGURE 2;

FIGURE 5 is a sectional view taken along the line 5—5 of FIGURE 4; and

FIGURE 6 is a diagram of the forces exerted by a spring for urging the master and test gears into meshing engagement.

The present invention is particularly adapted for use in a precision gear checking machine of the type in which a test gear 11 to be checked and a master gear 10 are supported in meshing engagement and test gear defects such as run-out or improper thickness of teeth result in relative rectilinear movement of the gears and an indication of such movement on a gage 12. In the machine shown in the drawings for purposes of illustration, the test gear is mounted between centers 13 on a carriage 16 which is adjustable rectilinearly along a dovetail guide 15 on a base 14, a suitable clamping bolt (not shown) being provided for locking the carriage in different positions along the guide. One center is clamped against a block 17 on the carriage and the other is carried by an arm 18 adjustable vertically along a column 19 rigid with the carriage.

The master gear 10 is supported on an arbor 20 which is clamped in a V-notch 21 on a slide 22 by one end of a clamping lever 23 fulcrumed on the slide and engaged at its other end by a clamping screw with a knob 24. To provide an anti-friction support for the slide, a bearing block 25 bolted to the base 14 is formed with laterally spaced V-grooves 26 on its upper side in parallel with the carriage pathway defined by the dovetail guide 15. The grooves form guideways for a plurality of ball bearings 27 which roll along the grooves and are separated by apertured spacer strips 28. Receiving the balls on the underside of the slide are two grooves 29 and 30 one of which is V-shaped to locate the slide laterally of the guideways and the other of which has a flat bottom. A stop 31 depending from the slide engages the remote end of the bearing block 25 to limit movement of the slide toward the centers 13 for the test gear.

The machine is intended for use on a horizontal table with the dovetail guide 15 and the guideways 26 disposed horizontally, the plane of the guideways also being horizontal. To retain parts in assembled relation with the slide 22 seated on the ball bearings 27, plates 32 bolted to the slide have inturned flanges fitting loosely in horizontal grooves 33 on the outer sides of the bearing block 25.

Movement of the master gear slide 22 back and forth along the guideways 26 is indicated by the gage 12 which has a supporting body 34 bolted to the machine base 16 and an actuating pin 35 engaging the end of the slide remote from the master gear arbor 20. A needle 36 rotates in opposite directions relative to a dial 37 as the slide moves back and forth. The bezel 38 of the gage carries the dial and is rotatable relative to the gage body to bring the zero point on the dial in registry with the needle when the machine is being readied to test a gear.

Under standards prescribed by the American Gear Manufacturers Association, the test gear 11 and the master gear 10 are urged together under different predetermined pressures depending on the diametrical pitch of the test gear. Diametrical pitch is defined as the ratio of the number of teeth to the number of inches of pitch diameter and varies from a ratio of 20 to a ratio of 150. The corresponding range of pressures urging the gears into mesh is from 28 ounces to 2 ounces. The prescribed pressures for given ranges of diametrical pitch are as follows:

| Pitch: | Pressure (ounces) |
|---|---|
| 20–29 | 28 |
| 30–39 | 24 |
| 40–49 | 20 |
| 50–59 | 16 |
| 60–79 | 12 |
| 80–99 | 8 |
| 100–149 | 4 |
| 150+ | 2 |

In accordance with the present invention, the meshing pressure urging the gears 10 and 11 together is derived from a spring 39 which acts between the slide 22 and the base 16 and is mounted in a novel manner to insure accuracy in the amount of pressure applied and facilitate adjustment of the pressure while also maintaining the slide in its proper relation on the bearings 27. To these ends, the spring 39 is of the coiled contractile or tensile type anchored at one end on the base and stretched between the anchor and a smaller slide 40 mounted in the gear supporting slide 22 for adjustable positioning relative to the gear slide along a straight pathway paralleling the bearing guideways. In a zero position of the small slide, the axis of the spring lies in a plane normal to the plane of the guideways 26 and there is no component of spring force acting longitudinally of the guideways to urge the gears into meshing engagement. As the smaller slide is moved along its pathway and away from the master gear arbor 20, the spring is stretched farther and its axis becomes inclined with respect to the plane normal to the plane of the guideways so that there is a component of spring force paralleling the guideway and urging the master gear slide toward the test gear centers. At the same time, there is a spring force component normal to the guideway plane to urge the master gear slide toward and into proper rolling engagement with the ball bearing 27. Preferably, the pathway for the smaller slide is equidistant from the guideways and the axis of the spring always is in a plane parallel to the guideways and normal to the plane of the guideways so that the component of spring force normal to the guideway plane is divided equally between the guideways.

To simplify the construction and positioning of the spring or adjusting slide 40, its pathway preferably is a parallel walled slot 41 cut vertically through a block 42 bolted to and forming a part of the test gear slide 22. The adjusting slide is a rectangular block, with parallel side walls fitting closely between and guided by the walls of the slot. Extending horizontally through the adjusting slide is a threaded bore to receive a threaded portion 43 of the shank of an adjusting bolt with a knob 44. The bolt extends through alined unthreaded holes in the slotted block 42 and its movement axially in one direction relative to the block is prevented by the knob engaging one end of the block. Movement of the bolt in the opposite direction is limited by engagement of a snap ring 45 on the other end of the bolt with the bottom of a recess in the other end of the block (FIGURE 4). With this construction, the bolt supports the adjusting slide 40 in the slot and, as the bolt is turned in opposite directions, the slide is shifted back and forth along the slot.

While the indicia 46 of the spring force may take various forms, in this instance, a single straight line 47 is cut on the top of the adjusting slide and graduations 48 with numerals are stamped on a separate plate 49 which is secured by screws to the top of the slotted block. The graduation mark nearest the master gear arbor 20 is identified as the 0 mark and those spaced farther from the centers are identified by successively increasing numerals.

To connect the spring 39 to the adjusting slide 40, an integral dog 50 depending from the slide is formed with a hole receiving the hooked upper end of the spring. The anchor for the lower end of the spring is simply a straight pin 51 fitting loosely in downwardly opening recesses 52 in side walls of the base, the recesses being located so that the pin is directly beneath the hole in the dog when the adjusting slide is in its zero position, the spring axis then being vertical. To provide clearance for the spring and slide dog, the base is hollow and alined holes 53 are formed in the test master slide 22, the bearing block 27 and in the base.

The action of the spring 39 is illustrated in FIGURE 6 which is a vector diagram of the spring forces. With the axis of the spring disposed vertically, that is, normal to the horizontal plane of the guideways 26 in the zero position of the adjusting slide 40, the entire spring force acts vertically to retain the master gear slide seated properly on the ball bearings. As the spring adjusting slide is shifted away from the master gear arbor 20, that is, to the left as viewed in the drawings, the spring force may be divided into horizontal and vertical components. In FIGURE 6, the resultant spring force in a position of the slide spaced from zero, for example, 16 ounces, is represented by one arrow 54 and the horizontal and vertical components by other arrows 55 and 56. As the adjusting slide is moved greater distances from the master gear arbor and the spring is stretched more, the vertical component remains constant but the horizontal component increases, the increased resultant and horizontal components being indicated by dotted line arrows 57 and 58.

In the use of the improved machine, the adjusting slide 40 is first located in its zero position by turning the knob 44 of the adjusting screw 43. Next, using gage blocks with the master gear slide 22 in its limit or righthand position as viewed in the drawing, the carriage 16 is moved until the test gear centers 13 are spaced from a center in the arbor clamp 23 for the master gear 10 precisely the desired distance which depends on the sizes of the gears. Then, still using the gage blocks with the gage actuating pin 35 against the master gear slide 22, the master carriage is advanced toward the bearing block 25 and the slide 22 is retracted from its limit position, that is, to the left as viewed in the drawings, a distance corresponding to one-half of the range of expected movement of the gage needle 36 in response to variations in the dimensions of the teeth of the test gear. For example, if the expected range of movement of the slide during testing corresponds to six revolutions of the gage needle, the slide will be moved initially to the left of its limit position a distance corresponding to three revolutions of the needle, this distance being on the order of a few thousandths of an inch which results in practically no change in the horizontal component of the spring 39. When the adjustment of the carriage is completed, the bezel 38 of the gage 12 and therewith the dial 37 are turned to position the zero in registry with the needle and the parts are set up to begin testing.

After the initial spacing of the axes of the gears 10 and 11 has been set, the gears are mounted between the test centers 13 and on the arbor 20 on the master gear slide 22 and the spring adjusting knob 44 is turned to shift the adjusting slide 40 along its pathway 41 to increase the horizontal component of the spring force to the prescribed number of ounces corresponding to the diametrical pitch of the test gear. This adjustment may be made quickly and easily because of the location of the adjusting slide and the indicia 46 where they are clearly visible. Then, the gears are turned slowly by hand and variations in the teeth of the test gear from a standard result in movement of the master gear slide 22 and a corresponding movement of the gage needle 36.

By virtue of the novel arrangement of the spring 39 and its adjusting slide 40, the prescribed amount of horizontal meshing pressure is applied easily to insure accuracy in the checking of the test gear 11. Also, the vertical component of spring force which assists gravity in urging the master gear slide 22 into proper engagement with the bearing balls 27 is applied equidistantly from each row of balls so that there is no horizontal component transversely of the rows. While a preferred embodiment has been shown and described, it will be understood that there is no intent to limit the invention by such disclosure but, rather, it is intended to cover all modifications and alternative constructions falling within the spirit and scope of the invention as defined in the appended claims.

I claim:

1. In a gear checking machine for comparing a test gear with a master gear, the combination of a base having straight parallel first guideways thereon, a first workholder adapted to support a first one of said gears for rotation about its axis, means mounting said workholder on said base for movement longitudinally of said guideways and including means for clamping the workholder in different positions of adjustment, a second workholder adapted to support the other of said gears rotatably in meshing engagement with said first gear and mounted on said guideways for limited movement toward and away from said first workholder, displacement indication means acting between said second workholder and said base and indicating displacement of the second workholder along said guideways and relative to the first workholder, another guideway on said second workholder paralleling and spaced equidistantly from said first guideways, a slide reciprocable in said other guideway, an adjusting coupling between said slide and said second workholder and including a threaded member for shifting the slide back and forth along said other guideway in response to turning of the member in opposite directions, and a coiled tensile spring stretched between said slide and said base with its axis disposed normal to the plane of said first guideways when said slide is in a zero position from which it is movable along said other guideway and away from said first workholder.

2. The combination of claim 1 in which said threaded member is rotatably mounted on said second workholder in parallel with said guideways, but is fixed against movement axially of the member and relative to the workholder, said member being threaded into and supporting said slide for movement along said other guideway.

3. The combination of claim 1 in which graduated indicia are provided on clearly visible exterior portions of said slide and said workholder to indicate the amount of force being exerted by said spring.

4. The combination of claim 1, in which each of the work holders has a vertical V-groove provided therein, the apex portions of which are in alignment longitudinally of the base with the adjusting coupling, and adapted to receive the cylindrical shank portion of a gear supporting center or arbor, and a quickly openable and closable elongated clamping lever disposed in a horizontal plane on the work holder and having a clamping end extending transversely of the V-groove for clamping engagement with the shank portion of the gear mounting center or arbor, said lever being pivoted on a vertical axis intermediate its ends in laterally spaced relation to the V-groove, there being a horizontally disposed screw threaded in the work holder having one end abutting the other end of the lever remote from the clamping end and adapted to be tightened manually to effect the clamping of the gear mounting center or arbor.

References Cited
UNITED STATES PATENTS

| | | | |
|---|---|---|---|
| 2,726,455 | 12/1955 | Saari | 33—179.52 |
| 2,447,445 | 8/1948 | Widen et al. | 33—179.52 |
| 2,821,024 | 1/1958 | Nyland | 33—179.52 |

SAMUEL S. MATTHEWS, *Primary Examiner.*